3,014,076
2,2,3 - TRI - (LOWER)ALKYL - 3 - (6 - HYDROXY - 2-NAPHTHYL) - 1 - PROPANETHIOLS AND DERIVATIVES THEREOF
Raymond M. Dodson, Park Ridge, and Paul B. Sollman, Wilmette, Ill., assignors to G. D. Searle & Co., Chicago, Ill., a corporation of Delaware
No Drawing. Filed Feb. 17, 1960, Ser. No. 9,205
9 Claims. (Cl. 260—609)

The present invention relates to a group of 2,2,3-tri-(lower)alkyl-3-(6-hydroxy-2-naphthyl) - 1 - propanethiols and derivatives thereof and to methods for their manufacture. The compounds of the present invention can be represented by the structural formula

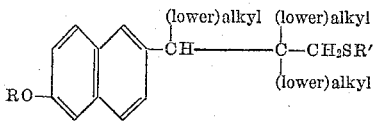

wherein R and R' are members of the group consisting of hydrogen, monovalent hydrocarbon radicals containing fewer than 9 carbon atoms, and acyl radicals derived from lower alkanoic acids. When R and R' in the foregoing structural formula are hydrocarbon radicals, they can represent lower alkyl groups such as methyl, ethyl, propyl, butyl, amyl, hexyl, heptyl, octyl, and branched-chain isomers thereof, as well as cyclic hydrocarbon radicals such as phenyl, cyclohexyl, cyclopentylethyl, cyclopentylpropyl and benzyl. The terms R and R' can also represent acyl radicals derived from lower alkanoic acids, and consequently include such groups as formyl, acetyl, propionyl, butyryl, valeryl, hexanoyl, heptanoyl, octanoyl, and branched-chain isomers thereof.

This application is a continuation-in-part of our copending application, Serial Number 523,362, filed July 20, 1955; and now abandoned.

Suitable starting materials for the manufacture of the new compositions of this invention are the compounds having the structural formula

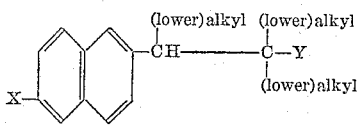

wherein X is a group which is convertible to a hydroxyl group under hydrolytic conditions, and Y is a hydroxymethyl or a group convertible to hydroxymethyl by reduction or hydrolysis, such as carboxyl, aldehydo or alkoxycarbonyl. One of the most useful of these starting materials, because of its accessibility from commercial manufacturing operations, is 2,2-dimethyl-3-(6-methoxy-2-naphthyl)pentanoic acid, a compound which has been accepted in chemotherapy for its estrogenic properties. Reduction of this compound with lithium aluminum hydride followed by esterification of the resulting alcohol with p-toluenesulfonyl chloride affords the p-toluenesulfonate of 2,2-dimethyl-3-(6-methoxy-2-naphthyl)-1-pentanol. When this ester is heated with an alkali metal hydrosulfide, replacement of the p-toluenesulfonoxy group by a thiol group proceeds with the formation of 2,2-dimethyl-3-(6-methoxy-2-naphthyl)-1-pentanethiol, a representative compound of this invention. Homologous thiols having different alkyl residues attached to the naphthalene nucleus are prepared in the same manner from other trialkylated-6-alkoxy-2-naphthalenepropionic acids which are known in the prior art, such as those described by Jacques and Horeau, Bull. Soc. Chim. 1948, 711.

A recommended method for manufacturing the free phenols corresponding to the general formula for the compounds of this invention is by heating a corresponding O-alkyl ether with pyridine hydrochloride. By this procedure, for example, 2,2-dimethyl-3-(6-methoxy-2-naphthyl)-1-pentanethiol is converted in good yield to 2,2-dimethyl-3-(6-hydroxy-2-naphthyl)-1 - pentanethiol. Ethers and esters comprehended within the scope of this invention are prepared by treating the parent compounds with appropriate alkylating, aralkylating, arylating or acylating agents.

The compounds of this invention are useful as a result of their valuable pharmacological properties. They are, for example, hypotensive agents. They are also anti-inflammatory agents as evidenced by their ability to inhibit the hyperemia associated with iritis. Furthermore, they have diuretic properties in consequence of their ability to inhibit the sodium-retaining activity of desoxycorticosterone acetate.

This invention will appear more fully from the examples which follow. These examples are set forth by way of illustration only, and it will be understood that the invention is not to be construed as limited in spirit or in scope by the details contained therein. It will be apparent to those skilled in the art that many modifications in materials and methods can be made without departing from the scope of this invention. In these examples, temperatures are given in degrees centigrade (° C.) and quantities of materials in parts by weight except where otherwise indicated.

Example 1

A solution of 32 parts of 2,2-dimethyl-3-(6-methoxy-2-naphthyl)pentanoic acid in 360 parts of anhydrous ether is added slowly to a stirred solution of 10 parts of lithium aluminum hydride in 710 parts of anhydrous ether, and the mixture is stirred at room temperature for about 18 hours. There is then added cautiously and in small portions 27 parts of ethyl acetate followed by 45 parts of a mixture containing equal volumes of ethanol and water. A violent reaction is caused by the addition of the first portion of aqueous ethanol. An additional 250 parts of water and 400 parts of 10% aqueous hydrochloric acid are added, and the organic layer is separated and washed with water, with 5% aqueous sodium hydroxide solution and finally with several portions of water. Concentration of the organic phase followed by recrystallization of the residue from petroleum ether yields 2,2-dimethyl-3-(6-methoxy-2-naphthyl)-1-pentanol melting at 82–83° C. and having the structural formula

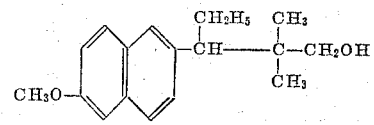

Example 2

A solution of 10 parts of 2,2-dimethyl-3-(6-methoxy-2-naphthyl)-1-pentanol in 25 parts of pyridine is mixed with a solution of 10 parts of p-toluenesulfonyl chloride in 25 parts of pyridine, and the slightly exothermic reaction is moderated by the use of an external cooling bath, so that the temperature of the reaction mixture does not exceed approximately 37° C. As the reaction proceeds pyridine hydrochloride begins to crystallize from the mixture. After about 18 hours the entire reaction mixture is poured into several times its volume of water, and the insoluble, gummy precipitate is washed by decantation and dissolved in ether. The ethereal solution is extracted with dilute hydrochloric acid, water, dilute sodium hydroxide solution and finally with several portions of water. The ethereal solution is dried over sodium sulfate, filtered and concentrated to dryness. Recrystallization of the residue from a mixture of ether and petroleum ether yields the p-toluenesulfonate of 2,2-dimethyl-3-(6-methoxy-2-naphthyl)-1-pentanol melting at 84–86° C.

*Example 3*

A solution of sodium hydrosulfide is prepared by passing a stream of hydrogen sulfide gas through a mixture of 335 parts of ethylene glycol monoethyl ether and 22.5 parts of sodium methoxide, until substantially all of the sodium methoxide is consumed, as evidenced by the completion of the exothermic reaction. About 30 minutes to one hour is a convenient period of time for this reaction.

This solution of sodium hydrosulfide is mixed with 12 parts of the p-toluenesulfonate of 2,2-dimethyl-3-(6-methoxy-2-naphthyl)-1-pentanol and heated under reflux for 2 hours. The mixture is poured into 2000 parts of water, acidified with dilute hydrochloric acid and extracted with ether. The ethereal extract is washed with several portions of water, dried over sodium sulfate, filtered and concentrated to dryness. The residue in petroleum ether solution is poured on a chromatography column prepared from 200 parts of silica, and eluates are collected with solvent mixtures of petroleum ether and benzene containing increasingly higher proportions of benzene. Elution with a 15 volume percent solution of benzene in petroleum ether affords crystalline fractions of 2,2-dimethyl-3-(6-methoxy-2-naphthyl)-1-pentanethiol. This compound can be further purified by recrystallization from methanol. It melts at about 60° C. and has the structural formula

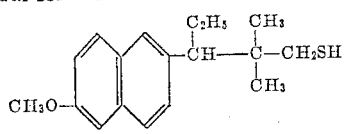

*Example 4*

A mixture of one part of 2,2-dimethyl-3-(6-methoxy-2-naphthyl)-1-pentanethiol and 5 parts of pyridine hydrochloride is heated to about 195–200° C. and maintained at this temperature for 2 hours. The reaction mixture is partitioned between ether and dilute hydrochloric acid, and the ethereal phase is washed with several portions of water, dried, filtered and concentrated to dryness. Recrystallization of the residue from a mixture of benzene and petroleum ether yields purified 2,2-dimethyl-3-(6-hydroxy-2-naphthyl)-1-pentanethiol melting at 104–105° C. and having the structural formula

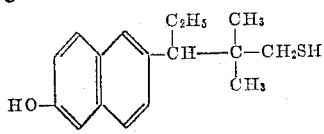

*Example 5*

A solution of 3 parts of 2,2-dimethyl-3-(6-methoxy-2-naphthyl)-1-pentanethiol in 20 parts of pyridine and 20 parts of acetic anhydride is allowed to stand at room temperature for about 18 hours. The mixture is poured, with stirring, into ice water, and the precipitated product is collected and purified by recrystallization from petroleum ether to yield 2-(α-ethyl-β,β-dimethyl-γ-acetylthiopropyl)-6-methoxynaphthalene melting at 92–94° C. and having the structural formula

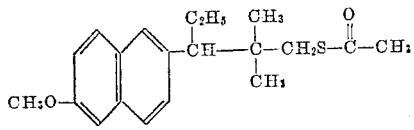

*Example 6*

A solution of 2 parts of 2,2-dimethyl-3-(6-hydroxy-2-naphthyl)-1-pentanethiol in 20 parts of pyridine and 15 parts of propionic anhydride is allowed to stand at room temperature for about 18 hours. The mixture is poured, with stirring, into ice water, and the precipitated 2-(α-ethyl-β,β-dimethyl-γ-propionylthiopropyl)-6-propionyloxynaphthalene is collected and washed with water. This compound has the structural formula

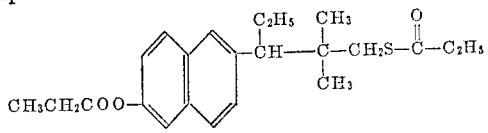

*Example 7*

2,2-dimethyl-3-(6-methoxy-2-naphthyl)-1-pentanethiol (1.45 parts) is dissolved in 50 parts of methanol containing 0.27 part of sodium methoxide. A solution of 0.70 part of methyl iodide in 8 parts of methanol is added and the mixture is heated under reflux for one hour. An additional 0.35 part of methyl iodide in 4 parts of methanol is added and refluxing is continued for an additional 30 minutes. The mixture is then diluted with several times its volume of water. The insoluble oil is washed by decantation with water and dried, and, in petroleum ether solution, purified by chromatography on a silica gel column. Elution of the column with a 20 volume percent solution of benzene in petroleum ether affords crystalline fractions of 2-(α-ethyl-β,β-dimethyl-γ-methylthiopropyl)-6-methoxynaphthalene. Further purification is achieved by recrystallization from refrigerated aqueous methanol. This compound melts at about 40–42° C. and has the structural formula

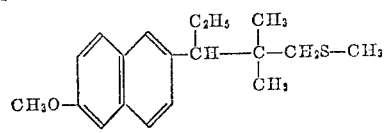

By the foregoing procedure, with the substitution of a total of 1.15 parts of ethyl iodide in divided portions for the methyl iodide, there is obtained 2-(α-ethyl-β,β-dimethyl-γ-ethylthiopropyl)-6-methoxynaphthalene.

*Example 8*

To a solution of 95 parts of 2,2-dimethyl-3-(6-hydroxy-2-naphthyl)pentanoic acid and 57.5 parts of pellets containing 85% potassium hydroxide in 1400 parts of absolute ethanol is added 253 parts of α-chlorotoluene. The solution is refluxed for 3 hours. Precipitated potassium chloride is removed by filtration of the hot reaction mixture. When the filtrate is allowed to cool and stand, a precipitate of the benzyl ester of 2,2-dimethyl-3-(6-benzyloxy-2-naphthyl)pentanoic acid separates. Concentration of the crystallization liquor followed by neutralization and distillation with steam affords an additional quantity of the crude product. After purification by recrystallization from ethanol, this compound melts at about 110–112° C. It has the structural formula

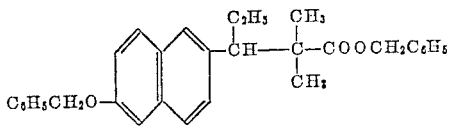

*Example 9*

A solution of 43 parts of the benzyl ester of 2,2-dimethyl-3-(6-benzyloxy-2-naphthyl)pentanoic acid, 1200 parts of ethanol, 100 parts of water and 150 parts of potassium hydroxide is heated under reflux for 16 hours. The reaction mixture is concentrated by a vacuum distillation until almost all of the ethanol has been removed, and the residue is stirred with 3000 parts of water. The insoluble potassium salt is collected on a filter and dissolved in a mixture of 550 parts of ethanol and 1000 parts of water. This solution is acidified by the addition of concentrated hydrochloric acid and diluted with an additional 3000 parts of water. The precipitated product is collected on a filter and purified by recrystallization from dilute acetic acid and from benzene. This compound is 2,2-dimethyl-3-(6-benzyloxy-2-naphthyl)pentanoic acid melting at about 189–190° C.

*Example 10*

To a solution of 57 parts of lithium aluminum hydride in 715 parts of ether is added a solution of 45 parts of 2,2-dimethyl-3-(6-benzyloxy-2-naphthyl)pentanoic acid in 2200 parts of ether, and the reaction mixture is heated under reflux for 22 hours. There is then added cautiously and in small portions 450 parts of ethyl acetate followed by 900 parts of water. The supernatant organic phase is separated from the precipitated inorganic solid and is concentrated to dryness under reduced pressure. Recrystallization of the residue from petroleum ether affords 2,2-dimethyl-3-(6-benzyloxy-2-naphthyl)-1-pentanol.

*Example 11*

The benzyl ester of 2,2-dimethyl-3-(6-benzyloxy-2-naphthyl)pentanoic acid (55 parts) is added in small portions to a stirred solution of 5.5 parts of lithium aluminum hydride in 500 parts of anhydrous ether, at such a rate that the reaction mixture is maintained at the reflux temperature. After the addition has been completed, the mixture is heated under reflux for an additional 2–3 hours. The reaction mixture is treated cautiously by the addition of water in small portions until the violent decomposition reaction is complete, after which water is added until a slurry of inorganic products in an aqueous phase separates at the bottom of the reaction vessel. The ethereal layer is separated by decantation and concentrated to dryness under reduced pressure. The crystalline residue is further purified by recrystallization from aqueous ethanol, affording 2,2-dimethyl-3-(6-benzyloxy-2-naphthyl)-1-pentanol, melting at 129.5–130.5° C. This compound is identical with the product of Example 10.

*Example 12*

A solution of 11.5 parts of 2,2-dimethyl-3-(6-benzyloxy-2-naphthyl)-1-pentanol in 25 parts of pyridine is mixed with a solution of 12 parts of p-toluenesulfonyl chloride in 25 parts of pyridine and the reaction mixture is allowed to stand at room temperature for about 18 hours. The entire reaction mixture is then poured into several times its volume of water, and the insoluble product is collected. Recrystallization from aqueous ethanol yields the p-toluenesulfonate of 2,2-dimethyl-3-(6-benzyloxy-2-naphthyl)-1-pentanol melting at 116–117° C.

*Example 13*

A solution of sodium hydrosulfide is prepared by passing a stream of hydrogen sulfide gas through a mixture of 400 parts of ethylene glycol monoethyl ether and 26 parts of sodium methoxide until substantially all of the sodium methoxide is consumed, as evidenced by the completion of the exothermic reaction. About 30 minutes to one hour is a convenient period of time for this reaction. This solution of sodium hydrosulfide is mixed with 12.4 parts of the p-toluenesulfonate of 2,2-dimethyl-3-(6-benzyloxy-2-naphthyl)-1-pentanol and heated under reflux for 2–3 hours. The reaction mixture is poured into 2000 parts of ice water and the solution is acidified by the addition of 36 parts of concentrated hydrochloric acid. The precipitated product is collected, washed with water and dried. This crude product, which amounts to about 9 parts, is dissolved in 300–400 parts of a 15 volume percent solution of benzene in petroleum ether, and the solution is poured on a chromatography column prepared from 260 parts of silica. Elution of the column with a 25 volume percent solution of benzene in petroleum ether affords crystalline fractions melting in the range of 95–105° C. By recrystallization of these fractions from aqueous ethanol there is obtained purified 2,2-dimethyl-3-(6-benzyloxy-2-naphthyl)-1-pentanethiol melting at 103–104° C. This compound has the structural formula

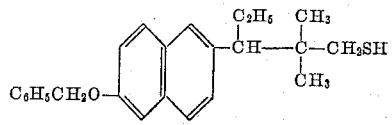

*Example 14*

A solution of 35 parts of 2,2-dimethyl-3-(6-methoxy-2-naphthyl)hexanoic acid in 425 parts of anhydrous ether is added slowly to a stirred solution of 12 parts of lithium aluminum hydride in 850 parts of anhydrous ether, and the mixture is stirred at room temperature for 20 hours. There is then added cautiously and in small portions 36 parts of ethyl acetate followed by 55 parts of a mixture containing equal volumes of ethanol and water, after which the reaction mixture is diluted with an additional 300 parts of water and 500 parts of 10% aqueous hydrochloric acid. The organic phase is separated and washed with water, with 5% aqueous sodium hydroxide solution and finally with several portions of water. Concentration of the organic phase affords a residue of crude 2,2-dimethyl-3-(6-methoxy-2-naphthyl)-1-hexanol. It is not necessary to purify this derivative for use in the next reaction. Ten parts of the crude 2,2-dimethyl-3-(6-methoxy-2-naphthyl)-1-hexanol is dissolved in 25 parts of pyridine and is stirred with a solution of 10 parts of benzenesulfonyl chloride in 25 parts of pyridine, and the reaction mixture is maintained at about 25° C. for 18 hours. The entire reaction mixture is then poured into several times its volume of water, and the insoluble, gummy precipitate is washed by decantation and dissolved in ether. The ethereal solution is washed with dilute hydrochloric acid, water, dilute sodium hydroxide solution and finally with several portions of water. When the residue resulting from concentration of the ethereal solution is recrystallized from a mixture of ether and petroleum ether, there is obtained the benzenesulfonate of 2,2-dimethyl-3-(6-methoxy-2-naphthyl)-1-hexanol.

*Example 15*

A solution of sodium hydrosulfide in ethylene glycol monoethyl ether is prepared by the procedure of Example 3 and is mixed with 12 parts of the benzenesulfonate of 2,2-dimethyl-3-(6-methoxy-2-naphthyl)-1-hexanol. The reaction mixture is heated under reflux for 2 hours and is then poured into 2000 parts of 5% hydrochloric acid. This aqueous suspension is extracted with ether, and the ethereal extract is washed with several portions of water, dried over sodium sulfate, filtered and concentrated to dryness. The crude residue in petroleum ether solution is poured on a chromatography column prepared from 200 parts of silica, and eluates are collected with solvent mixtures of petroleum ether and benzene containing increasingly higher proportions of benzene. Elution with a 15 volume percent solution of benzene in petroleum ether affords crystalline fractions of 2,2-dimethyl-3-(6-methoxy-2-naphthyl)-1-hexanethiol. This compound has the structural formula

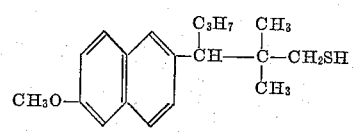

*Example 16*

By the procedure of Example 4, with the substitution of 2,2-dimethyl-3-(6-methoxy-2-naphthyl)-1-hexanethiol for the 2,2-dimethyl-3-(6-methoxy-2-naphthyl)-1-pentanethiol, there is obtained 2,2-dimethyl-3-(6-hydroxy-2-naphthyl)-1-hexanethiol having the structural formula

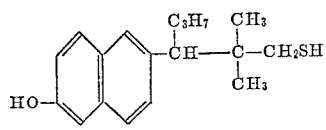

What is claimed is:
1. A compound having the structural formula

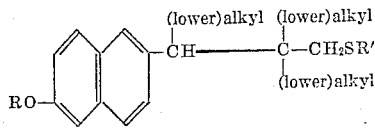

wherein R and R′ are members of the group consisting of hydrogen, alkyl, aryl, and aralkyl radicals containing fewer than 9 carbon atoms, and acyl radicals derived from lower alkanoic acids.

2. A compound having the structural formula

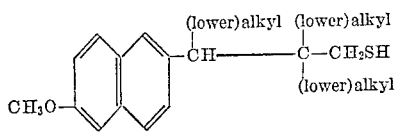

3. 2,2-dimethyl-3-(6 - methoxy-2-naphthyl)-1-pentanethiol.
4. 2,2 - dimethyl-3-(6-hydroxy-2-naphthyl)-1-pentanethiol.
5. 2,2-dimethyl-3-(6-benzyloxy-2-naphthyl)-1-pentanethiol.
6. 2 - ($\alpha$ - ethyl - $\beta,\beta$ - dimethyl-$\gamma$-methylthiopropyl)-6-methoxynaphthalene.

7. In a process for the manufacture of a compound having the structural formula

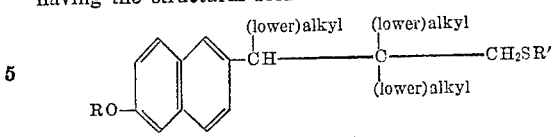

wherein R and R′ are members of the group consisting of hydrogen, alkyl, aryl, and aralkyl radicals containing fewer than 9 carbon atoms, and acyl radicals derived from lower alkanoic acids, the step which comprises heating a solution of a compound having the structural formula

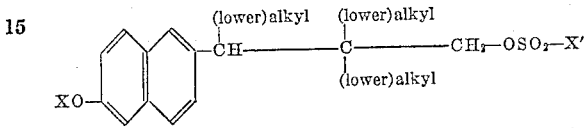

wherein X and X′ are alkyl, aryl, and aralkyl radicals containing fewer than 9 carbon atoms, with an alkali metal hydrosulfide.

8. In a process for the manufacture of 2,2-dimethyl-3-(6-methoxy-2-naphthyl)-1-pentanethiol, the step which comprises heating a solution of the p-toluenesulfonate of 2,2-dimethyl-3-(6-methoxy-2-naphthyl)-1-pentanol in a monoalkyl ether of ethylene glycol with sodium hydrosulfide, and isolating the resulting product.

9. In a process for the manufacture of 2,2-dimethyl-3-(6-benzyloxy - 2 - naphthyl)-1-pentanethiol, the step which comprises heating a solution of the p-toluenesulfonate of 2,2-dimethyl-3-(6-benzyloxy-2-naphthyl)-1-pentanol in a monoalkyl ether of ethylene glycol with sodium hydrosulfide, and isolating the resulting product.

No references cited.